1,567,493

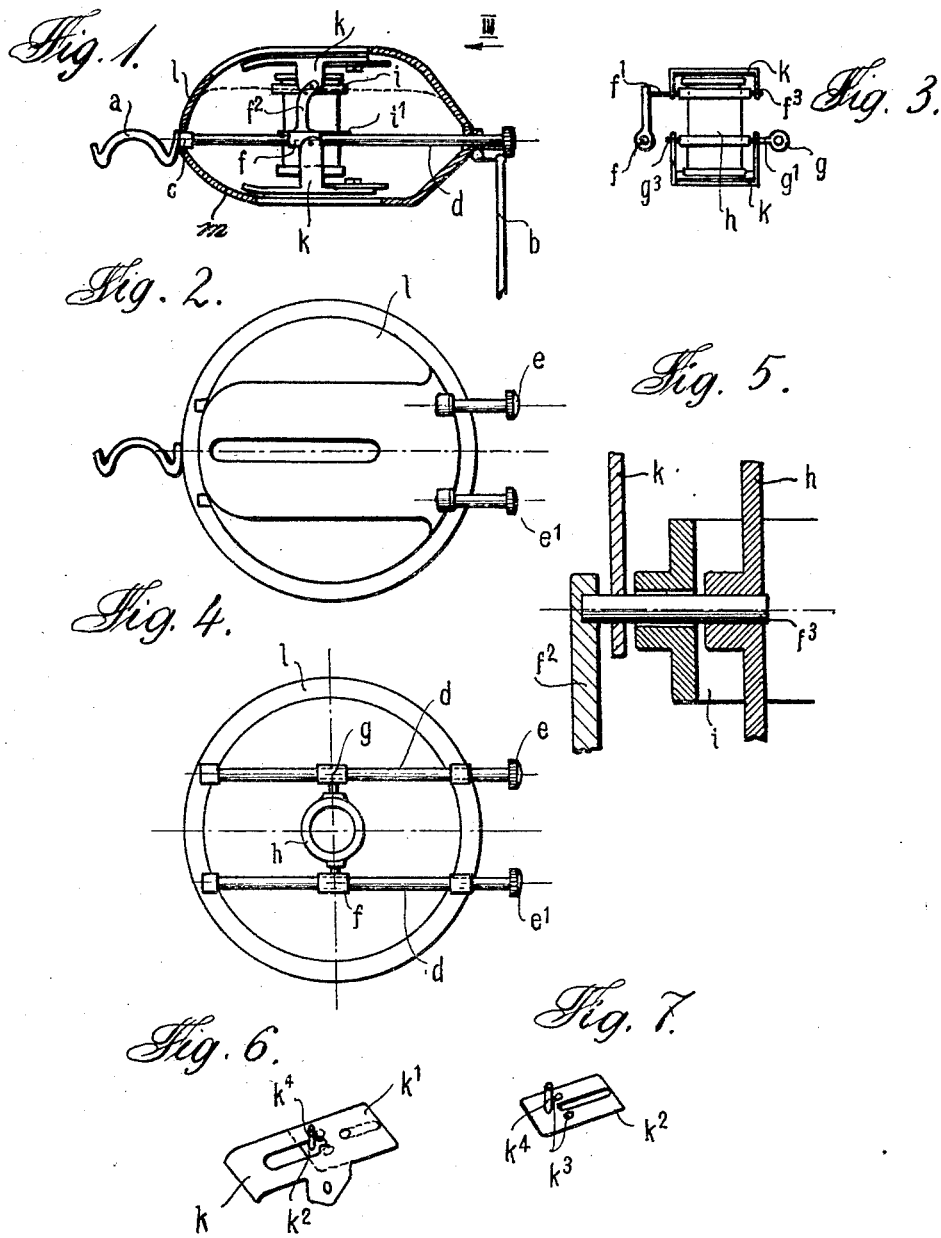
Dec. 29, 1925.  1,567,498
E. GAUGLER
SHOOTING GLASSES FOR MARKSMEN
Filed March 30, 1925
Inventor
F. Gaugler Patented Dec. 29, 1925.

UNITED STATES PATENT OFFICE.

EMIL GAUGLER, OF BELLACH, SWITZERLAND.

SHOOTING GLASSES FOR MARKSMEN.

Application filed March 30, 1925. Serial No. 19,512.

*To all whom it may concern:*

Be it known that I, EMIL GAUGLER, citizen of the Confederation of Switzerland, residing at Bellach, Canton of Soleure, Switzerland, have invented certain new and useful Improvements in Shooting Glasses for Marksmen, of which the following is a specification.

While aiming the eye is directed towards the nose and upwards. The eye will therefore look obliquely through looking-glasses of ordinary construction. This causes an abnormal refraction and a distorted image and does greatly impair the certainty of hitting.

Shooting-glasses have therefore been proposed where the sighting line coincides with the geometrical axis of the dioptrics. This was obtained either by means of a ball joint or by means of other devices fixed to the frame and carrying the optics. These however were not sufficiently stable and were exposed to many external influences. At every shot or any other movement made by the marksman the optics changed its position with regard to the eye of the man and if the fixing members were made solid enough so as to prevent such change it became notwithstanding necessary to change the position of the optics when the glasses had to be stored away.

The present invention relates to shooting-glasses which do not show the defects named. The optics of the sighting eye are mounted in the frame in such a way that the position thereof can only be altered if the marksman is willing to do so and may remain unaltered if the glasses are not in use.

In the annexed drawing one working form is shown of such shooting-glasses as an example.

Fig. 1 is a section across the sighting-eye.

Fig. 2 is a front view of this eye.

Fig. 3 is a view of the optics of the sighting eye taken in direction of the arrow shown in Fig. 1.

Fig. 4 is a top view of the optics of the sighting eye certain parts being left out for the sake of clearness.

Fig. 5 is a section of a trunnion which will be mentioned hereinafter, and

Figs. 6 and 7 are details of a blind.

The bridge-piece of the represented glasses is designated with $a$, the bows with $b$ and the frame with $c$. On this frame are seated two parallel spindles $d$ provided with milled buttons $e$ $e'$ as handles. Two slides $f$ $g$ supporting the optics of the sighting eye may be moved by means of these spindles. These optics are lodged within a tube $h$ and may comprise one or more lenses arranged according to the sighting capacity of the marksman so as to correct the imperfections of the wearer's vision and to bring about normal conditions. Ordinarily a light-filter formed by a yellow disc is also arranged within the said tube as this is generally to be found in shooting-glasses.

The slides $f$ and $g$ are supporting the tube $h$ by means of trunnions $f^1$ $g^1$ which may be easily recognized from Fig. 3. The axes of these trunnions are located in the same center plane as the tube $h$ containing the optics of the sighting eye. These trunnions however are not displaced on the same diameter of the tube but along the axis of the latter. While trunnion $g^1$ is located in the plane of the two spindles, trunnion $f^1$ is lodged at the top end of an arm $f^2$ which stands vertically on the slide $f$. Wherefore if any of the buttons $e$ or $e^1$ is turned tube $h$ will be pivoted in one way or the other. The axis of the lenses will therefore be brought into an oblique position with regard to the plane of the frame $c$. But if both spindles are turned about the same angles the said axis will be displaced parallelly to itself. Thus it is possible to displace the geometrical middle axis of the lenses parallelly to the frame, which axis in order to give good results must coincide with the optical axis and it is possible likewise to adjust this axis in any position obliquely to the plane of the frame. Once adjusted this position will be quite independent from the recoil of the rifle or from other movements.

Opposite to each trunnion $f^1$ or $g^1$ an auxiliary trunnion $f^3$ or $g^3$ is provided at the end of the same diameter of tube $h$. These two trunnions, as shown in Fig. 5, are intended to support rings $i$ and blinds $k$ arranged on both sides of tube $h$. These blinds are constructed in the same way. Each comprises a perforated plate $k^1$ (see Figs. 6 and 7) having lugs on both sides whereby it rests on trunnions $f^1$ $f^3$ and $g^1$ $g^3$ respectively.

Underneath each plate there is a slide $k^2$ which is hinged by means of a screw to plate $k^1$. This slide is slotted so as to be enabled to execute not only longitudinal movements along plate $k$ but also swinging movements so as to register the holes $k^3$ with the middle axis of the optical system. This is done by means of a pin $k^4$ protruding from plate $k$.

The sighting-eye is entirely covered up and protected by means of two shells $l$ and $m$ of different depth and held fast opposite to each other within the frame. These shells have a slot at their middle part through which the pins $k^4$ of the blinds are accessible. Shell $l$ is slightly elevated at its center portion which is shown in Fig. 2. This elevated part has the same width as plate $k$ of the blind. The latter is therefore guided at the inside of the shell and thereby also the tube is held fast to some extent so that it cannot be moved too much around its axis. If this axis of the tube is inclined towards the bridge $a$ and is inclined by turning on spindle $e^1$ the blind will also assume an oblique position with regard to the plane of the frame.

From the above it will be seen that it is possible not only to adjust the optical axis inside of the frame but also according to need more or less obliquely with regard to the plane of the frame. The casual position is secured not only by the position of the slides $f$ and $g$ but the whole mechanism is protected and covered up by the shells. The sighting eye is protected by means of the shield-like shells not only against too much light but also against any mechanical attacks.

The optics enclosed within the tube and the shells is practically indestructible and this is an important feature if the security of the sighting eye is regarded. Finally the whole apparatus may be stored away in its adjusted state so as to be at once useful at any time for sighting.

Having now fully described and ascertained my invention and in what manner the same is to be performed that what I claim is:

1. In shooting-glasses and in combination a frame with bows, two parallel screw spindles mounted rotatably to said frame, handles adapted to move said spindles independently from each other, slides fitted to said spindles and a tube containing the dioptrics hinged to said slides at points diametrically opposite each other and so as to hold the tube at two points set at a certain distance from each other for the purpose set forth.

2. In shooting-glasses and in combination a frame with bows, two parallel screw spindles mounted rotatably to said frame, slides fitted to said spindles, a tube containing the dioptrics attached to said slides and a pair of protecting shells fixed to the frame so as to enclose the tube and provided with slots arranged so as to let the optical axis pass for the purpose set forth.

3. In shooting-glasses and in combination a frame with bows, a tube containing the dioptrics mounted on slides, means carried by the frame adapted to move said slides, a pair of protecting shells fixed to the frame so as to enclose the tube and provided with slots letting the optical axis pass and blinds at each end of the tube inside of the shells and adjusting means for tube and blinds said means being accessible from the outside of the shells all substantially as shown and described.

In testimony whereof I affix my signature.

EMIL GAUGLER.